Dec. 25, 1951     A. L. TRUMP     2,579,982
FLUID CONTROL VALVE
Filed July 6, 1946     2 SHEETS—SHEET 1

INVENTOR
Arthur Lewis Trump.
By  *A. E. Odell*
   Attorney.

Dec. 25, 1951 — A. L. TRUMP — 2,579,982
FLUID CONTROL VALVE
Filed July 6, 1946 — 2 SHEETS—SHEET 2

INVENTOR
Arthur Lewis Trump
By A. T. O'dell
Attorney.

Patented Dec. 25, 1951

2,579,982

UNITED STATES PATENT OFFICE 2,579,982

FLUID CONTROL VALVE

Arthur Lewis Trump, Cwmbran, England, assignor, by mesne assignments, to Saunders Valve Company Limited, Cwmbran, England, a corporation of Great Britain Application July 6, 1946, Serial No. 681,628
In Great Britain January 8, 1945

Section 1, Public Law 690, August 8, 1946
Patent expires January 8, 1965

2 Claims. (Cl. 251—24)

The present invention relates to improvements in the construction of quick acting diaphragm valves. One purpose of the invention is to enable greater use to be made in the construction of quick acting valves of the parts that are standard in the more usual screw-operated diaphragm valves. A further purpose is the simplification of the machining necessary in making the valve parts.

According to the present invention the valve is operated by two cams only one on the actuator and the other on a rotating member having a stem journalled in and projecting from the bonnet to receive the operating handle and having a through bore to accommodate spring means urging the cams into contact. One of the cams may be formed of the full depth required for movement of the diaphragm from full open to full closed positions, the other being suitably shaped to cooperate therewith, preferably being of complementary form rather than a mere follower having only line contact.

By means of the invention a cam surface on the bonnet is dispensed with and this enables a standard bonnet as used in screw-operated valves to be used. Also the through bore in the stem on the rotating cam provides a very convenient means for holding this member for certain of the necessary machining operations. Drilling of this bore may be the first machining operation on the casting and the bore will then serve for generally holding the casting for the further operations upon it.

A construction embodying the present invention is illustrated by way of example in the accompanying drawings, in which.

Figure 1:
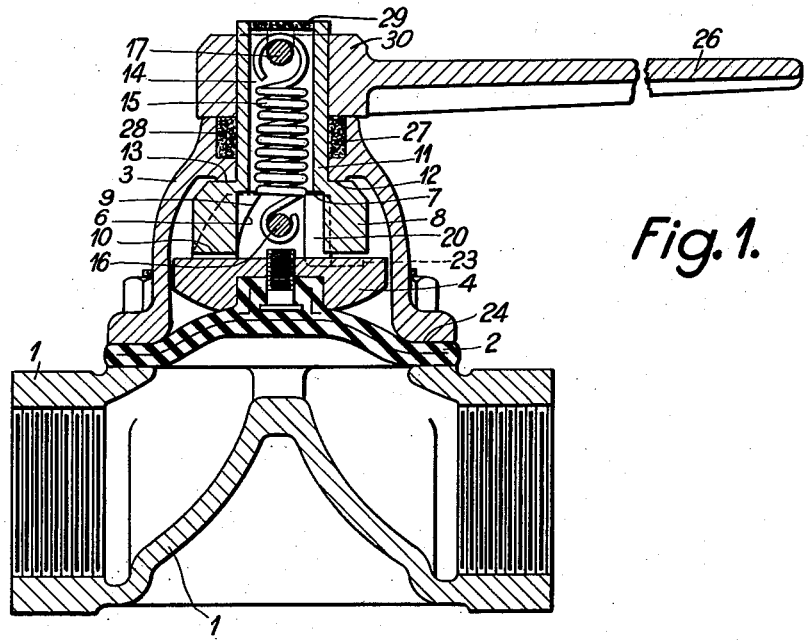
Figures 1 and 2 are longitudinal sections of a complete valve in the open and closed positions respectively.
Figure 3:
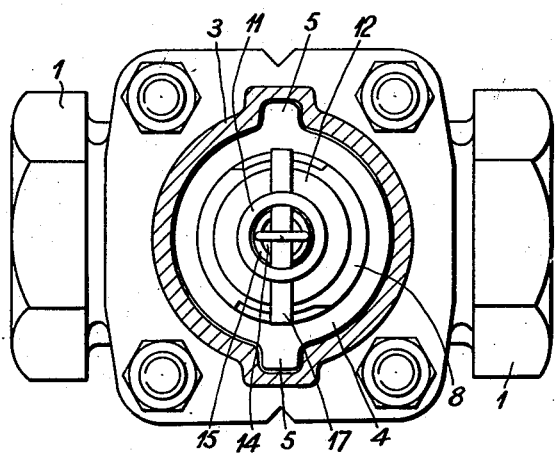
Figure 3 is a plan view partly in section.

The valve illustrated comprises a body 1, diaphragm 2, and bonnet 3 all of well known form and the diaphragm is pressed into closing position by an actuator 4 which is also of well known form as regards its under-face and the lugs 5 which engage grooves in the bonnet to prevent its rotation while permitting it to move longitudinally of the bonnet.

On the upper face of the actuator 4 is a multi-section cam, each section comprising a helical or sloping face 6 and a plane face 7. Coacting therewith is a rotatable member 8 having cam sections complementary to the sections 6, 7 and accordingly also comprising helical or sloping faces 9 and plane faces 10. This member 8 also has a stem 11 machined to project through and turn in an opening in the outer end of the bonnet 3, and a plane annulus 12 on its back which bears against a plane facing 13 in the bonnet against which the reaction of the closing pressure is taken. The stem 11 is bored right through at 14 to accommodate a tension spring 15 anchored between a cross pin 16 in the actuator 4 and another cross pin 17 in the stem 11, so drawing the actuator 4 and member 8 together.

Figure 2:
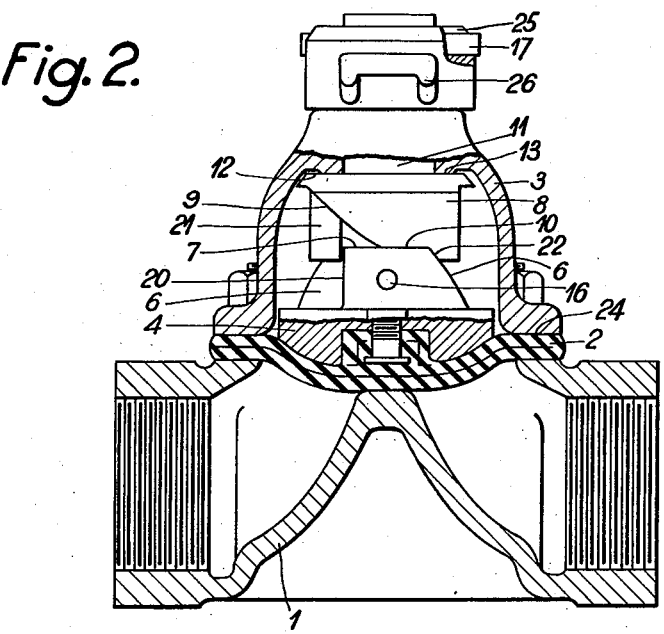
Figure 4:
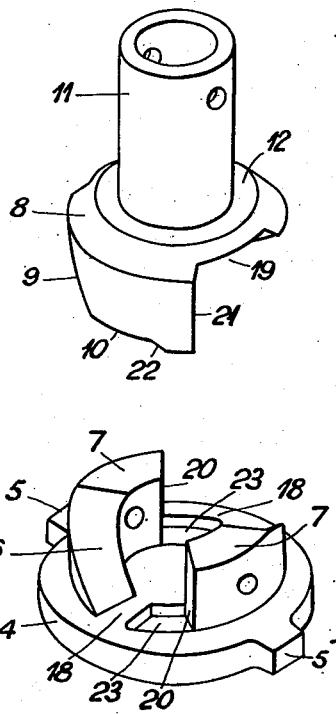
Figure 4 is a perspective view of certain details.

The cam sections on the members 4 and 8 are of such height that by rotating the member 8 from the position of Figure 1 to that of Figure 2 the diaphragm is moved from full open to closed position and vice versa. The sloping or helical faces 6, 9 are of such length circumferentially that the movement from full open to full closed position is obtained by a conveniently short angle of rotation of the member 8. In the illustrated example, these faces 6, 9 extend over about 60° and there are two such faces diametrically opposite on each of the members 4, 8. The plane faces 7, 10 may also extend over about 60° and the plane faces 18, 19 between the cams will then also extend over about 60°.

In the illustrated example the cam contours are completed by axial faces 20, 21 and these form stops which limit the rotation of the member 8 in the opening direction. Small shoulders 22 may be provided on the member 8 which by contacting with the faces 6 act as stops which limit the rotation of the member 8 in the closing direction. If these are placed so that in conjunction with faces 6, 9 extending over 60°, the total range of movement of the member 8 is about 90°, an adequate length of the faces 7, 10 will be in contact when the valve is closed. To accommodate the shoulders 22 when the valve is open, recesses 23 are provided in the faces 18 of the actuator 4.

It will be apparent that the height of the cams, added to the thickness of certain associated parts must be held within fairly narrow limits in relation to the depth of the bonnet if leakage on the one hand and excessive deformation of the diaphragm on the other hand are to be avoided when the valve is closed. In commercial production sufficiently close tolerances can be obtained by machining only the faces 13, 24 of the bonnet and the annular face 12 of the member 8, but if desired other surfaces such as the faces 7, 10 may also be machined.

In the illustrated example the pin 17 projects beyond the stem 11 and its ends lie in a groove 25 in the eye 30 of an operating handle 26 and so transmits the necessary torque for operating the valve from the handle to the stem. The parts are dimensioned so that the under face of the eye rides on the end face of the bonnet and in conjunction with the spring 15 prevents the weight of the moving parts from pressing on the diaphragm in the open position of the valve. The eye also retains a lubricant-impregnated felt ring 27 in a recess 28 in the bonnet 3 surrounding the opening through which the stem projects. The upper end of the bore in the stem 11 may be closed by a plug 29.

I claim:

1. In a diaphragm valve comprising a body having inlet and outlet passages therein, a diaphragm movable between positions in which it closes and opens communication between the passages, a bonnet, and an actuator in the bonnet for moving said diaphragm, the combination of a rotatable member in said bonnet which rotates without moving longitudinally, a stem on said rotatable member projecting from said bonnet and having a through bore, two cooperating cams for moving said actuator, one formed on said actuator and the other on said rotatable member, a tension spring in the bore of said stem, cross pins anchoring the ends of said spring respectively to said actuator and said stem thereby urging said cams into contact with one another, and operating means on the projecting part of said stem.

2. A diaphragm valve as set forth in claim 1 wherein said operating means comprises a handle, an eye on the handle fitting upon the end of said stem and having a groove across its outer face, the cross pin anchoring the spring to the actuator having its ends engaging in said groove.

ARTHUR LEWIS TRUMP.

REFERENCES CITED

The following references are of record in the file of this patent:

UNITED STATES PATENTS

| Number | Name | Date |
|---|---|---|
| 102,773 | Carey | May 10, 1820 |
| 945,556 | Lavigne | Jan. 4, 1910 |
| 1,939,911 | McCune | Dec. 19, 1933 |
| 2,096,528 | Saunders | Oct. 19, 1937 |
| 2,294,437 | Allen | Sept. 1, 1942 |